(12) United States Patent
Sakamoto et al.

(10) Patent No.: US 10,818,965 B2
(45) Date of Patent: Oct. 27, 2020

(54) CERAMIC GARNET BASED IONICALLY CONDUCTING MATERIAL

(71) Applicant: The Regents of the University of Michigan, Ann Arbor, MI (US)

(72) Inventors: Jeffrey Sakamoto, Ann Arbor, MI (US); Travis Thompson, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 236 days.

(21) Appl. No.: 15/646,327

(22) Filed: Jul. 11, 2017

(65) Prior Publication Data

US 2018/0013171 A1    Jan. 11, 2018

Related U.S. Application Data

(60) Provisional application No. 62/360,770, filed on Jul. 11, 2016.

(51) Int. Cl.
*H01M 10/0562* (2010.01)
*H01M 10/0525* (2010.01)
(Continued)

(52) U.S. Cl.
CPC ......... *H01M 10/0562* (2013.01); *C04B 35/50* (2013.01); *C04B 35/6261* (2013.01);
(Continued)

(58) Field of Classification Search
None
See application file for complete search history.

(56) References Cited

U.S. PATENT DOCUMENTS

| 8,092,941 B2 | 1/2012 | Weppner et al. |
| 8,658,317 B2 | 2/2014 | Weppner et al. |

(Continued)

FOREIGN PATENT DOCUMENTS

| JP | 2013032259 A | 2/2013 |
| JP | 2015130481 A | 7/2015 |
| WO | 2014153534 A1 | 9/2014 |

OTHER PUBLICATIONS

"Fast microwave-assisted synthesis of Li-stuffed garnets and insights into Li diffusion from muon spin spectroscopy" by Amores et al. J. Mater. Chem. A, 2016, 4, 1729-1736.*

(Continued)

*Primary Examiner* — Basia A Ridley
*Assistant Examiner* — Heng M. Chan
(74) *Attorney, Agent, or Firm* — Quarles & Brady LLP

(57) ABSTRACT

Disclosed is a ceramic material having a formula of $Li_wA_xM_2Re_{3-y}O_z$, wherein w is 5-7.5; wherein A is selected from B, Al, Ga, In, Zn, Cd, Y, Sc, Mg, Ca, Sr, Ba, and any combination thereof; wherein x is 0-2; wherein M is selected from Zr, Hf, Nb, Ta, Mo, W, Sn, Ge, Si, Sb, Se, Te, and any combination thereof; wherein Re is selected from lanthanide elements, actinide elements, and any combination thereof; wherein y is 0.01-0.75; wherein z is 10.875-13.125; and wherein the material has a garnet-type or garnet-like crystal structure. The ceramic garnet based material is ionically conducting and can be used as a solid state electrolyte for an electrochemical device such as a battery or supercapacitor.

21 Claims, 5 Drawing Sheets

(51) Int. Cl.

| | | |
|---|---|---|
| *C04B 35/50* | (2006.01) | |
| *C04B 35/645* | (2006.01) | |
| *C04B 35/626* | (2006.01) | |
| *H01M 4/04* | (2006.01) | |
| *H01M 4/62* | (2006.01) | |
| *H01M 4/38* | (2006.01) | |
| *H01M 12/08* | (2006.01) | |

(52) U.S. Cl.
CPC ............ *C04B 35/645* (2013.01); *H01M 4/04* (2013.01); *H01M 4/624* (2013.01); *H01M 10/0525* (2013.01); *C04B 2235/32* (2013.01); *C04B 2235/3203* (2013.01); *C04B 2235/3206* (2013.01); *C04B 2235/3208* (2013.01); *C04B 2235/3213* (2013.01); *C04B 2235/3215* (2013.01); *C04B 2235/3217* (2013.01); *C04B 2235/3227* (2013.01); *C04B 2235/3244* (2013.01); *C04B 2235/3251* (2013.01); *C04B 2235/3256* (2013.01); *C04B 2235/3258* (2013.01); *C04B 2235/3284* (2013.01); *C04B 2235/3286* (2013.01); *C04B 2235/3287* (2013.01); *C04B 2235/3293* (2013.01); *C04B 2235/3294* (2013.01); *C04B 2235/3409* (2013.01); *C04B 2235/3418* (2013.01); *C04B 2235/44* (2013.01); *C04B 2235/442* (2013.01); *C04B 2235/443* (2013.01); *C04B 2235/763* (2013.01); *C04B 2235/765* (2013.01); *H01M 4/382* (2013.01); *H01M 12/08* (2013.01); *H01M 2300/0077* (2013.01); *Y02E 60/128* (2013.01); *Y02T 10/7011* (2013.01)

(56) References Cited

U.S. PATENT DOCUMENTS

| | | |
|---|---|---|
| 8,841,033 B2 | 9/2014 | Yamamura et al. |
| 8,940,446 B1 | 1/2015 | Holme et al. |
| 9,093,717 B2 | 7/2015 | Sakamoto et al. |
| 9,099,729 B2 | 8/2015 | Tsujiko et al. |
| 9,362,546 B1 | 6/2016 | Donnelly et al. |
| 9,450,271 B2 | 9/2016 | Weppner et al. |
| 2010/0203383 A1 | 8/2010 | Weppner |
| 2011/0053001 A1 | 3/2011 | Babic et al. |
| 2011/0053002 A1* | 3/2011 | Yamamura ............ C01G 33/006 429/322 |
| 2013/0026409 A1 | 1/2013 | Baker et al. |
| 2014/0170465 A1 | 6/2014 | Visco et al. |
| 2014/0287305 A1 | 9/2014 | Wachsman et al. |
| 2014/0295287 A1 | 10/2014 | Eisele et al. |
| 2016/0329598 A1* | 11/2016 | Schneider ................. C03C 3/12 |
| 2016/0365579 A1* | 12/2016 | Xing ..................... H01M 4/133 |
| 2018/0114977 A1 | 4/2018 | Sakamoto et al. |

OTHER PUBLICATIONS

"Effect of Simultaneous Substitution of Y and Ta on the Stablization of Cubic Phase, Microstructure, and Li+ Conductivity of Li7La3Zr2O12 Lithium Garnet" by Dhivya et al., ACS Applied Mater. Interfaces 2014, 6, 17606-71615.*

Mukhopadhyay, et al., Structure and Stoichiometry in Supervalent Doped Li7La3Zr2O12, Chemistry of Materials, 2015, 27(10):3658-3665.

Murugan, et al., Fast Lithium Ion Conduction in Garnet-Type Li7La3Zr2O12, Angew. Chem. Int. Ed., 2007, 46:7778-7781.

Rangasamy, et al., The Role of Al and Li Concentration on the Formation of Cubic Garnet Solid Electrolyte of Nominal Composition Li7La3Zr2O12, Solid State Ionics, 2011, 206:28-32.

Rangasamy, et al., The Effect of 24c-site (A) Cation Substitution on the Tetragonal-Cubic Phase Transition in Li7_xLa3_xAxZr2O12 Garnet-Based Ceramic Electrolyte, Journal of Power Sources, 2013, 230:261-266.

Thangadurai, et al., Li6ALa2Ta2O12 (A=Sr, Ba): Novel Garnet-Like Oxides for Fast Lithium Ion Conduction, Advanced Functional Materials, 2005, 15(1):107-112.

Thangadurai, et al., Recent Progress in Solid Oxide and Lithium Ion Conducting Electrolytes Research, Ionics, 2006, 12:81-92.

Thompson, et al., A Tale of Two Sites: On Defining the Carrier Concentration in Garnet-Based Ionic Conductors for Advanced Li Batteries, Advanced Energy Materials, 2015, 1500096, 9 pages.

Xu, et al., Mechanisms of Li+ Transport in Garnet-Type Cubic Li3+xLa3M2O12 (M=Te, Nb, Zr), Physical Review B, 2012, 85:052301, 5 pages.

PCT International Search Report and Written Opinion, PCT/US2017/041456, dated Nov. 13, 2017.

Han et al., Negating Interfacial Impedance in Garnet-Based Solid-State Li Metal Batteries, Nature Materials, 2017, 16 (5):572-579.

Ohta et al., Co-Sinterable Lithium Garnet-Type Oxide Electrolyte With Cathode for All-Solid-State Lithium Ion Battery, Journal of Power Sources, 2014, 265:40-44.

Ramzy et al., Tailor-Made Development of Fast Li Ion Conducting Garnet-Like Solid Electrolytes, ACS Applied Materials & Interfaces, 2010, 2(2):385-390.

* cited by examiner

CERAMIC GARNET BASED IONICALLY CONDUCTING MATERIAL

CROSS-REFERENCES TO RELATED APPLICATIONS

This application claims priority to U.S. patent application Ser. No. 62/360,770 filed Jul. 11, 2016.

STATEMENT REGARDING FEDERALLY SPONSORED RESEARCH

Not Applicable.

BACKGROUND OF THE INVENTION

1. Field of the Invention

This invention relates to electrochemical devices, such as lithium ion conducting solid-state electrolytes, solid-state lithium ion batteries, and solid-state lithium metal batteries. In one embodiment, the lithium ion conducting solid-state electrolyte comprises a ceramic garnet based ionically conducting material.

2. Description of the Related Art

Lithium ion (Li-ion) battery technology has advanced significantly and has a market size projected to be $10.5 billion by 2019. Current state of the art lithium ion batteries comprise two electrodes (an anode and a cathode), a separator material that keeps the electrodes from touching but allows $Li^+$ ions through, and an electrolyte (which is an organic liquid with lithium salts). During charge and discharge, $Li^+$ ions are exchanged between the electrodes.

State-of-the-art (SOA) Li-ion technology is currently used in low volume production plug-in hybrid and niche high performance vehicles; however, widespread adoption of electrified powertrains requires 25% lower cost, 4 times higher performance, and safer batteries without the possibility of fire. One approach is to develop solid-state battery technology. Solid-state batteries offer the promise of 3-4 times the energy density compared to the SOA Li-ion batteries at a reduction in the pack cost of 20%.

Currently, the liquid electrolyte used in SOA Li-ion batteries is not compatible with advanced battery concepts, such as the use of a lithium metal anode or high voltage cathodes. Furthermore, the liquid utilized in SOA Li-ion batteries is flammable and susceptible to combustion upon thermal runaway. The use of a solid electrolyte to replace the liquid used in the SOA enables advanced cell chemistries while simultaneously eliminating the risk of combustion. Several solid-electrolytes have been identified including $Li_2PO_2N$ (LiPON) or sulfide based glasses, and companies have been formed to commercialize these types of technologies. While progress has been made towards the performance of cells of these types, large scale manufacturing has not been demonstrated since LiPON must be vapor deposited and sulfide glasses form toxic $H_2S$ upon exposure to ambient air. Thus, special manufacturing techniques are required for those systems.

Super conducting oxides (SCO) have also been proposed for use in a solid-state electrolyte. Although several oxide electrolytes are reported in the literature, selection of a particular material is not trivial since several criteria must be simultaneously satisfied. The following metrics were identified on a combination of the SOA Li-ion battery technology baseline: (1) conductivity >0.2 mS/cm, comparable to SOA Li-ion battery technology, (2) negligible electronic conductivity, (3) electrochemical stability against high voltage cathodes and lithium metal anodes, (4) high temperature stability, (5) reasonable stability in ambient air and moisture, and (6) ability to be manufactured at a thicknesses of <50 microns. Until recently, no SCO simultaneously met the above criteria.

In 2007, high Li ion conductivity in the garnet family of super conducting oxides was identified [see, Thangadurai, et al., *Adv. Funct. Mater.* 2005, 15, 107; and Thangadurai, et al., *Ionics* 2006, 12, 81], maximizing with the SCO garnet based on $Li_7La_3Zr_2O_{12}$ (LLZO) [see, Murugan, et al., *Angew. Chem. Inter. Ed.* 2007, 46, 7778]. Since then, it has been shown that LLZO can meet all of the criteria necessary for a solid-electrolyte outlined above.

Several compositions in the garnet family of materials are known to exhibit Li-ion conduction with the general formula $Li_{3+a}M_2Re_3O_{12}$ (where a=0-3, M=a metal with +4, +5, or +6 valence, and Re=a rare earth element with a+3 valence) [see, Xu, et al., *Phys. Rev. B* 2012, 85, 052301]. T. Thompson, A. Sharafi, M. D. Johannes, A. Huq, J. L. Allen, J. Wolfenstine, J. Sakamoto, *Advanced Energy Materials* 2015, 11, 1500096, identified which compositions, based on Li content, exhibit maximal Li-ionic conductivity. LLZO is a particularly promising family of garnet compositions. Several strategies for increasing the conductivity of LLZO including (1) doping with elements such as Al, Fe, Y, Ga, Ba, and Ca, and (2) forming solid solutions with other garnet families such as LLTO ($Li_5La_3Ta_2O_{12}$) and LLNO ($Li_5La_3Nb_2O_{12}$) have been identified [see Thompson, et al., *Advanced Energy Materials* 2015, 11, 1500096]. Both of the mechanisms mentioned (doping and solid solutions) rely on substitution on the Li site and/or the M site (Zr in the instance of LLZO). Substitution on the Re site (La in the instance of LLZO) has also been attempted [see, E. Rangasamy, J. Wolfenstine, J. L. Allen, J. Sakamoto, *Journal of Power Sources* 2013, 230, 261], but both experimental and computational previous reports suggest the Re site is especially stable and has met limited success [see, S. Mukhopadhyay, T. Thompson, J. Sakamoto, A. Huq, J. Wolfenstine, J. L. Allen, N. Bernstein, D. A. Stewart, M. D. Johannes, *Chemistry of Materials* 2015, 27, 3658.].

Therefore, what is needed is an improved material for the fabrication of a solid state electrolyte such that the solid state electrolyte can provide higher ion conductivity compared to previous solid state electrolytes.

SUMMARY OF THE INVENTION

The foregoing needs are met by a ceramic material according to the invention. The ceramic material has a formula of $Li_wA_xM_2Re_{3-y}O_z$, wherein w is 5-7.5; wherein A is selected from B, Al, Ga, In, Zn, Cd, Y, Sc, Mg, Ca, Sr, Ba, and any combination thereof; wherein x is 0-2; wherein M is selected from Zr, Hf, Nb, Ta, Mo, W, Sn, Ge, Si, Sb, Se, Te, and any combination thereof; wherein Re is selected from lanthanide elements, actinide elements, and any combination thereof; wherein y is 0.01-0.75; wherein z is 10.875-13.125; and wherein the material has a garnet-type or garnet-like crystal structure.

A solid state electrolyte comprising the ceramic material of the invention can be incorporated into a lithium ion battery for applications such as small unmanned military ground robotics, powered surgical hand tools, wearables, consumer electronics, automotive starting, and automotive electric vehicles.

It is one advantage of the invention to provide a material for the fabrication of a solid state electrolyte wherein the material has reduced rare earth content thereby decreasing geopolitical risk and reducing cost of the material.

It is another advantage of the invention to provide a material for the fabrication of a solid state electrolyte wherein the material has improved low temperature conductivity.

These and other features, aspects, and advantages of the present invention will become better understood upon consideration of the following detailed description, drawings, and appended claims.

DETAILED DESCRIPTION OF THE INVENTION

The present invention provides a ceramic garnet based ionically conducting material that can be used as a solid state electrolyte for an electrochemical device such as a battery or supercapacitor.

Figure 1:
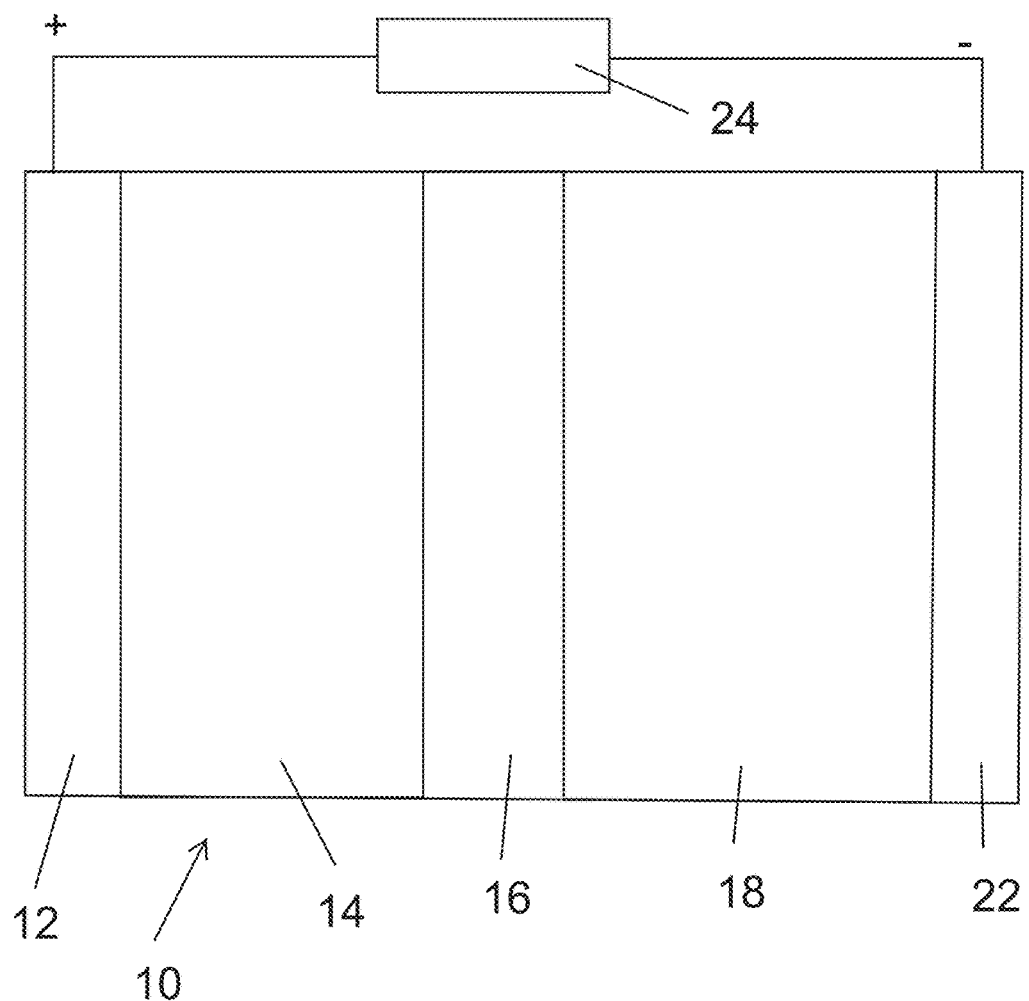
FIG. 1 is a schematic of a lithium ion battery.

In one non-limiting example application, a solid state electrolyte comprising the material of the invention is used in a lithium ion battery as depicted in FIG. 1. The lithium ion battery 10 of FIG. 1 includes a current collector 12 (e.g., aluminum) in contact with a cathode 14. A solid state electrolyte 16 comprising the material of the invention is arranged between the cathode 14 and an anode 18, which is in contact with a current collector 22 (e.g., aluminum). The current collectors 12 and 22 of the lithium ion battery 10 may be in electrical communication with an electrical component 24. The electrical component 24 could place the lithium ion battery 10 in electrical communication with an electrical load that discharges the battery or a charger that charges the battery.

A suitable active material for the cathode 14 of the lithium ion battery 10 is a lithium host material capable of storing and subsequently releasing lithium ions. An example cathode active material is a lithium metal oxide wherein the metal is one or more aluminum, cobalt, iron, manganese, nickel and vanadium. Non-limiting example lithium metal oxides are $LiCoO_2$ (LCO), $LiFeO_2$, $LiMnO_2$ (LMO), $LiMn_2O_4$, $LiNiO_2$ (LNO), $LiNi_xCo_yO_2$, $LiMn_xCo_yO_2$, $LiMn_xNi_yO_2$, $LiMn_xNi_yO_4$, $LiNi_xCo_yAl_zO_2$, $LiNi_{1/3}Mn_{1/3}Co_{1/3}O_2$ and others. Another example of cathode active materials is a lithium-containing phosphate having a general formula $LiMPO_4$ wherein M is one or more of cobalt, iron, manganese, and nickel, such as lithium iron phosphate (LFP) and lithium iron fluorophosphates. Many different elements, e.g., Co, Mn, Ni, Cr, Al, or Li, may be substituted or additionally added into the structure to influence electronic conductivity, ordering of the layer, stability on delithiation and cycling performance of the cathode materials. The cathode active material can be a mixture of any number of these cathode active materials.

A suitable active material for the anode 18 of the lithium ion battery 10 is a lithium host material capable of incorporating and subsequently releasing the lithium ion such as graphite, lithium titanium oxide, hard carbon, a tin/cobalt alloy, or silicon/carbon. The anode active material can be a mixture of any number of these anode active materials.

Figure 2:
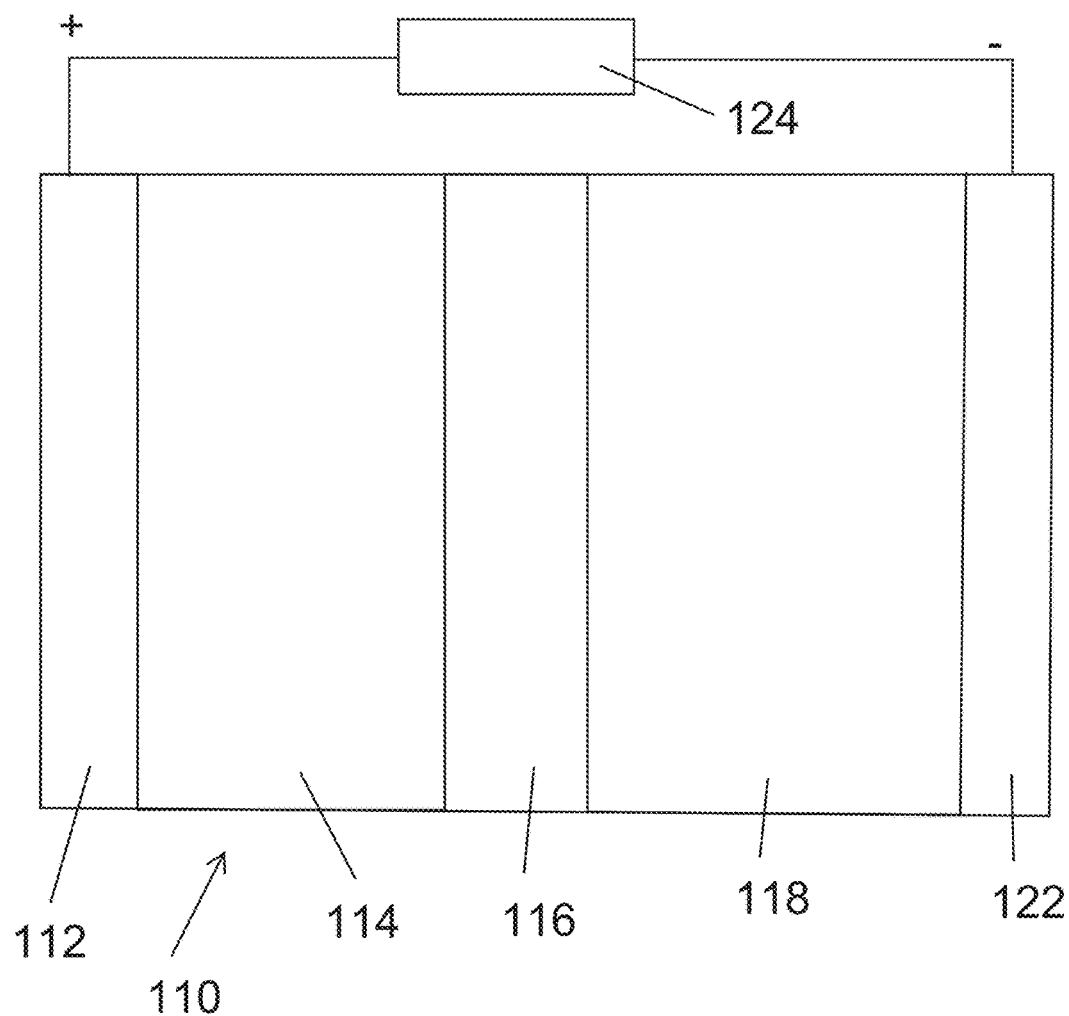
FIG. 2 is a schematic of a lithium metal battery.

In another non-limiting example application, a solid state electrolyte comprising the material of the invention is used in a lithium metal battery as depicted in FIG. 2. The lithium metal battery 110 of FIG. 2 includes a current collector 112 in contact with a cathode 114. A solid state electrolyte 116 comprising the material of the invention is arranged between the cathode 114 and an anode 118, which is in contact with a current collector 122. The current collectors 112 and 122 of the lithium metal battery 110 may be in electrical communication with an electrical component 124. The electrical component 124 could place the lithium metal battery 110 in electrical communication with an electrical load that discharges the battery or a charger that charges the battery. A suitable active material for the cathode 114 of the lithium metal battery 110 is one or more of the lithium host materials listed above, or porous carbon (for a lithium air battery), or a sulfur containing material (for a lithium sulfur battery). A suitable active material for the anode 118 of the lithium metal battery 110 is lithium metal.

Certain garnet based materials are useful for forming solid state electrolytes. For the garnet family of materials that exhibit lithium ion conduction with the general formula $Li_{3+a}M_2Re_3O_{12}$, where a=0-3, M=a metal with +4, +5, or +6 valence, and Re=a rare earth element with a +3 valence, most research articles use the Re site as the "standard" with which to ground comparisons when the other sites are altered to determine the composition. The present invention is a new garnet ceramic material where the Re site is highly deficient relative to the LLZO ($Li_7La_3Zr_2O_{12}$) reference formulation. This is non-obvious since the Re site (La in the instance of LLZO) is typically considered the most stable. Common wisdom for those skilled in the art would be to not alter the stoichiometry of that site. However, it was found though our investigations that synthesizing the ceramic material with a La deficiency still results in a garnet phase with high purity. Additionally, the same scheme of doping with Al on the Li site to stabilize the high conducting cubic phase is possible. Furthermore, the Li content can be tuned such that part of the sample is enriched and converts to tetragonal (see FIG. 3). The relative fraction of each can be tuned and the enriched tetragonal portion acts as a lithium reservoir to counteract lithium loss during subsequent high temperature processing.

A ceramic material of the invention is considered a new phase and not a new doped variant. For example, when doping is performed (i.e., $Al^{+3}$ on $Li^{+1}$), something else in the crystal needs to change to maintain charge neutrality and typically Li balances the charge. In these materials, charge must also be balanced. If Li was charge balancing, the Li content in the sample would need to increase and the tetragonal phase would result. However, not enough Li is present to balance the La deficiency and the cubic phase is still dominant. Thus, without intending to be bound by theory, Li charge balancing cannot be the mechanism.

Figure 3:
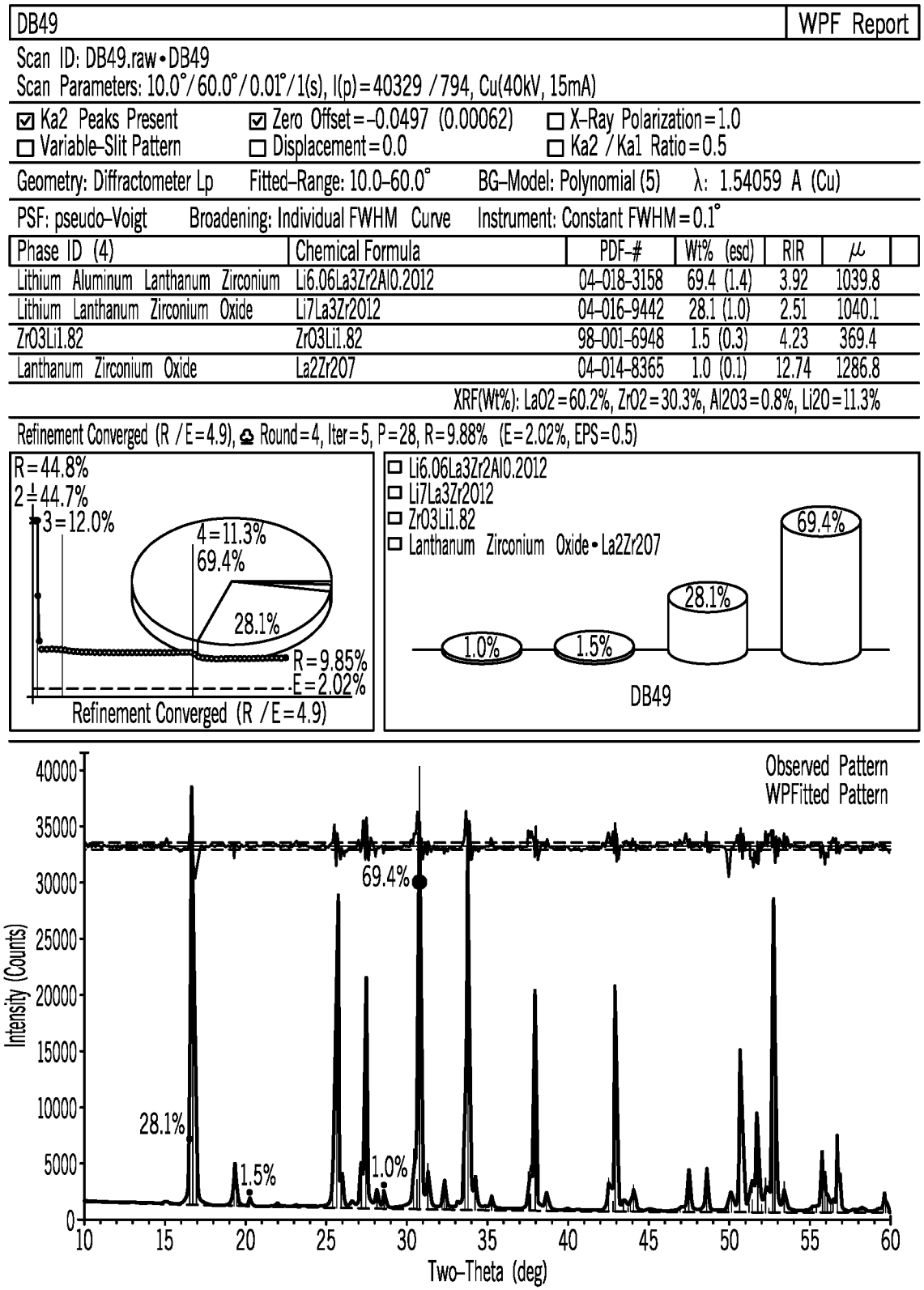
FIG. 3 shows a whole profile fitting of the new garnet phase of this disclosure. The experimental pattern of the new phase was fitted using database entries of known garnet phases and impurities. It can be seen that the reference phases do not fully describe the new phase as evident by the R/E residual ratio of 4.9. This value would converge to unity when the correct structural model is applied. It is expected that the new garnet phase has the same space groups as the database references but substantially different atomic site occupancies.
Figure 4:
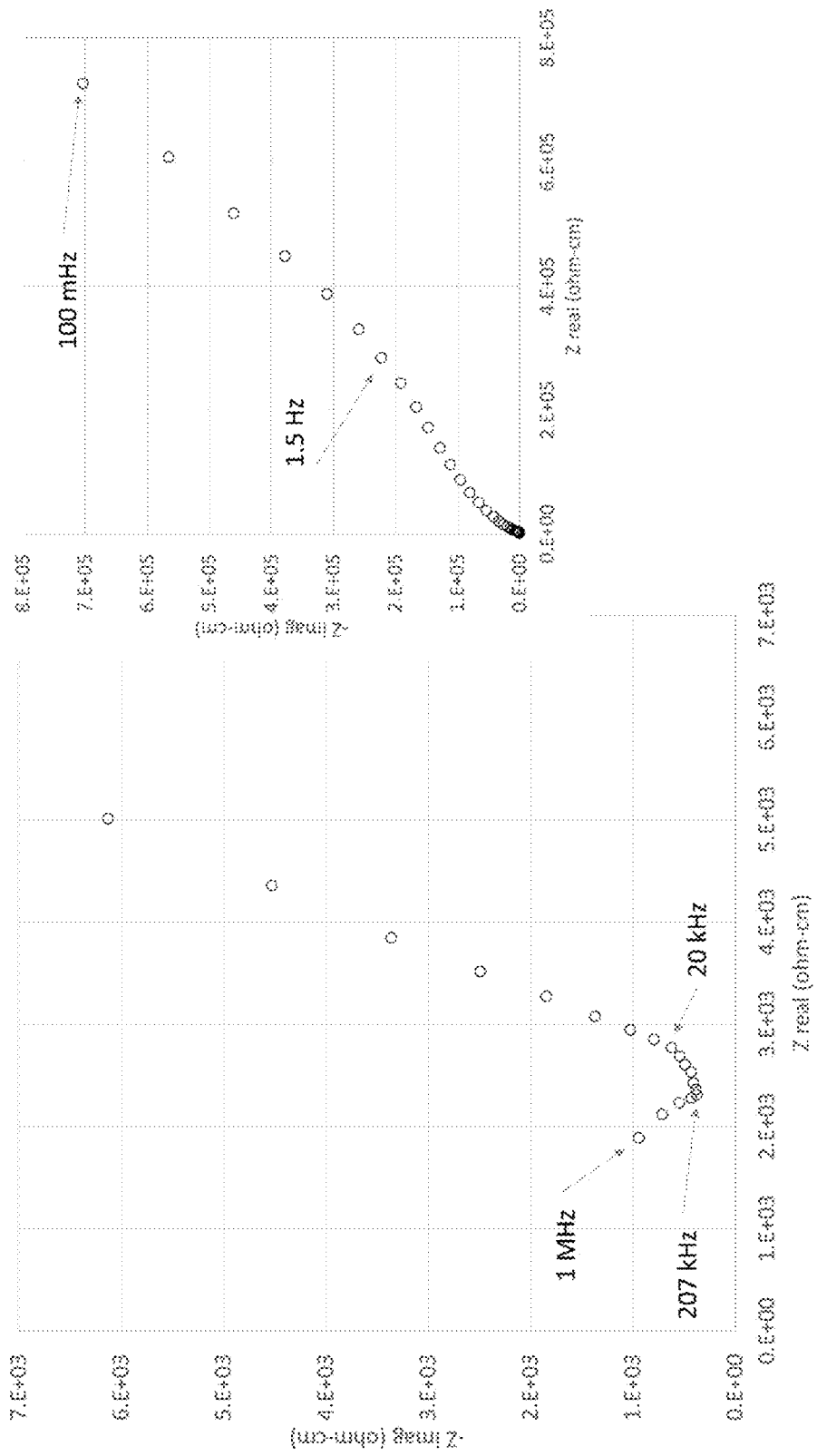
FIG. 4 shows a Nyquist plot of the impedance data at room temperature for a hot-pressed disk made of the new garnet ceramic material of this disclosure. The high frequency portion shows that fast ion conduction is achieved and that the grain-boundary portion of the total impedance is ~12%. The inset shows the low frequency portion indicating that blocking behavior is maintained and the sample is behaving like an electrolyte.

The new garnet phase of a material of the invention exhibits fast ion conduction similar to doped LLZO phases (see FIG. 4). The room temperature total Li ionic conductivity of the sample shown in FIG. 3 is 0.37 mS/cm. This is close to the reported values for conventional Al doped (0.3-0.4 mS/cm) and lower than the highest reported values for solid solutions (1 mS/cm). The sample shown in FIG. 3 was Al doped and forming solid solutions to further increase the conductivity should also be possible with this garnet ceramic material. For comparison, the conductivity of a separator soaked in liquid electrolyte used in state of the art Li-ion batteries is 0.1-0.3 mS/cm.

Figure 5:
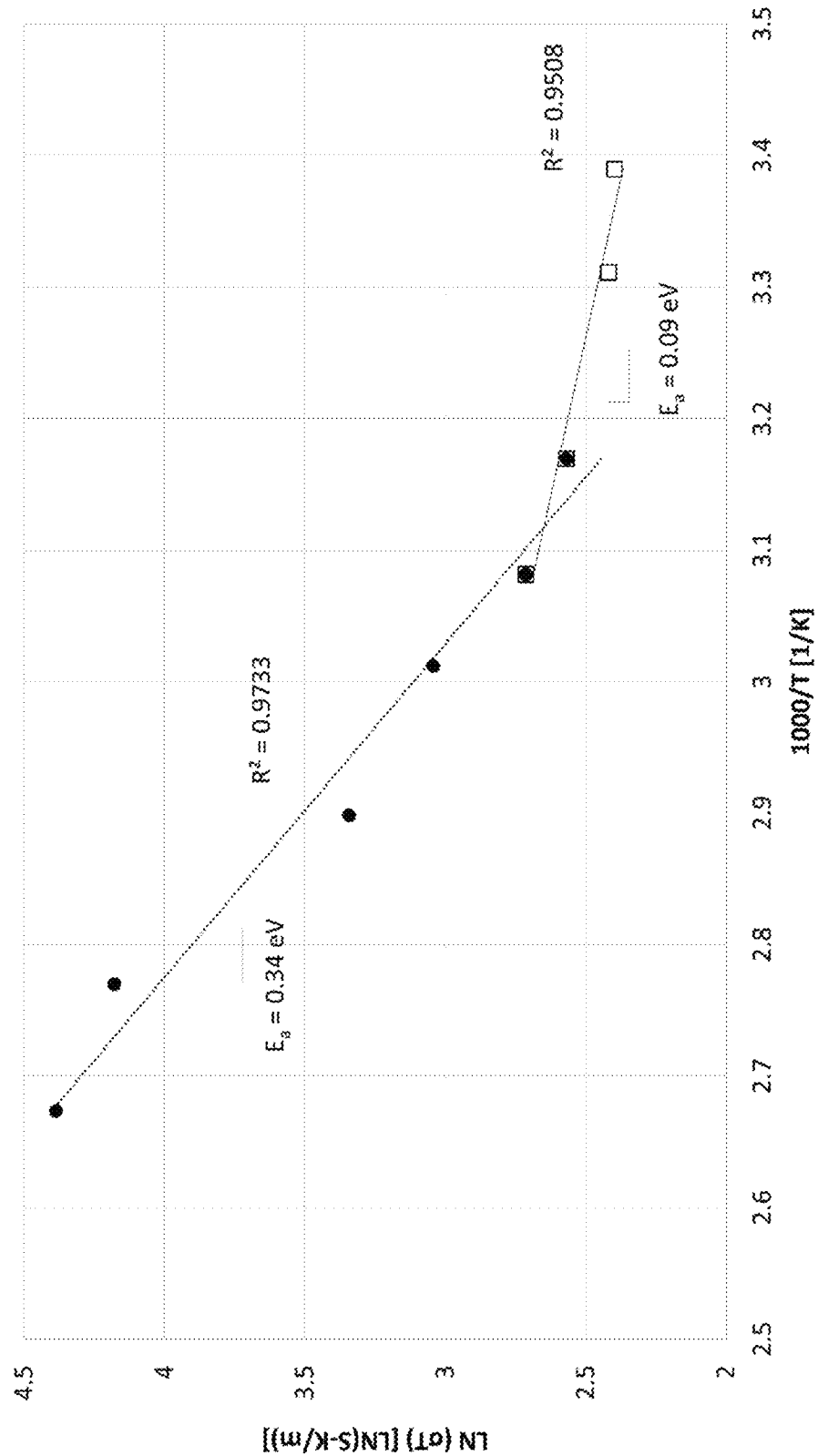
FIG. 5 shows an Arrhenius plot of the total conductivity for the sample shown in FIG. 3. Two regions can be observed with the transition occurring between 40° C. and 50° C.

The activation energy for the same sample is shown in FIG. 5. Linear behavior suggests an activated Li conduction process and the slope is the activation energy. The lower the activation energy, the easier Li ions can conduct. This is especially important at low temperatures. Too high of an activation energy means that the conductivity will drop to unacceptably low levels at cold temperatures. Many applications including cold cranking in automotive need low temperature performance. Two regions can be seen in FIG. 5 with a transition between 40° C. and 50° C. (~3.1 1000/K). The high temperature region exhibits an activation energy of 0.34 eV agrees with similar conventional Al doped garnet compositions. The low temperature region exhibits unusually low activation energy of 0.09 eV not observed in other garnet formulations.

In one embodiment, a ceramic material of the invention has a formula of $Li_wA_xM_2Re_{3-y}O_z$, wherein w is 5-7.5; wherein A is selected from B, Al, Ga, In, Zn, Cd, Y, Sc, Mg, Ca, Sr, Ba, and any combination thereof; wherein x is 0-2; wherein M is selected from Zr, Hf, Nb, Ta, Mo, W, Sn, Ge, Si, Sb, Se, Te, and any combination thereof; wherein Re is selected from lanthanide elements, actinide elements, and any combination thereof; wherein y is 0.01-0.75; wherein z is 10.875-13.125; and wherein the material has a garnet-type or garnet-like crystal structure. In one embodiment, A is Al, x is greater than zero, M is Zr, and Re is lanthanum. In one embodiment, w is 6-7, x is 0.2-0.3, y is 0.01-0.5, and z is 11.5-12.5. In one non-limiting example embodiment, the material has the formula:

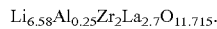

$Li_{6.58}Al_{0.25}Zr_2La_{2.7}O_{11.715}$.

In one form, the ceramic material has space groups $Ia\bar{3}d$ (no. 230). In one form, the ceramic material has space groups $I4_1/acd$ (no. 142). In one form, the ceramic material has space groups $Ia\bar{3}d$ (no. 230), and the material has space groups $I4_1/acd$ (no. 142). In one form, the ceramic material at least partially has a tetragonal crystal structure.

The ceramic material can have a total ionic conductivity greater than $10^{-5}$ S/cm. The ceramic material can have a total lithium ionic conductivity greater than $10^{-5}$ S/cm. The ceramic material can have an activation energy for ion conduction of less than 0.5 eV. The ceramic material can have an activation energy for lithium ion conduction of less than 0.2 eV at temperatures less than 40° C. The ceramic material can have an activation energy for lithium ion conduction of less than 0.1 eV at temperatures less than 40° C.

The invention also provides an electrochemical device comprising a cathode; an anode; and a solid-state electrolyte comprising any of the embodiments of the ceramic material of the invention. The solid-state electrolyte may comprise a solid solution of the ceramic material of the invention and an additional material having a garnet-type or garnet-like crystal structure such as $Li_5La_3Ta_2O_{12}$ (LLTO) and/or $Li_5La_3Nb_2O_{12}$ (LLNO). In one example embodiment, the cathode comprises a lithium host material selected from the group consisting of lithium metal oxides wherein the metal is one or more aluminum, cobalt, iron, manganese, nickel and vanadium, and lithium-containing phosphates having a general formula $LiMPO_4$ wherein M is one or more of cobalt, iron, manganese, and nickel. In one example embodiment, the anode comprises a lithium host material selected from the group consisting of graphite, lithium titanium oxides, hard carbon, tin/cobalt alloy, and silicon/carbon. In one example embodiment, the anode comprises a lithium metal. In one example embodiment, the electrochemical device includes a lithium metal anode and a cathode comprising sulfur. In one example embodiment, the electrochemical device includes a lithium metal anode and a cathode comprising an air electrode.

The invention also provides method for forming a ceramic material. The method includes the steps of: (a) mixing a first solid comprising a lithium oxide or a lithium salt, a second solid comprising a lanthanum oxide or a lanthanum salt; and a third solid comprising a zirconium oxide or a zirconium salt to form a mixture; and (b) calcining the mixture to form the ceramic material, wherein a weight ratio of the first solid to the second solid is selected such that a lanthanum site in the ceramic material is deficient relative to a reference material having a formula of $Li_7La_3Zr_2O_{12}$ (LLZO). The ceramic material can be charge neutral.

Step (a) of the method may comprise mixing the first solid, the second solid, the third solid and a fourth solid comprising an aluminum oxide or an aluminum salt to form the mixture. The lithium salt can be selected from lithium carbonate, lithium nitrate and lithium hydroxide; the lanthanum salt can be selected from lanthanum carbonate, lanthanum nitrate and lanthanum hydroxide; the zirconium salt can be selected from zirconium carbonate, zirconium nitrate and zirconium hydroxide; and the aluminum salt can be selected from aluminum carbonate, aluminum nitrate and aluminum hydroxide. In one embodiment, the first solid comprises lithium carbonate, the second solid comprises lanthanum hydroxide, the third solid comprises zirconium oxide, and the fourth solid comprises aluminum oxide. Step (b) of the method can comprise calcining the mixture at a temperature from 400° C. to 1200° C., or from 600° C. to 1200° C., or from 800° C. to 1200° C., or from 900° C. to 1100° C., for 1 to 20 hours, or for 2 to 10 hours, or for 2 to 6 hours.

In the method, the first solid can provide lithium ions, the second solid can provide lanthanum ions, and a weight ratio of the first solid to the second solid can be selected such that a molar ratio of the lithium ions to the lanthanum ions is less than 2.5. The weight ratio of the first solid to the second solid can be also selected such that a molar ratio of the lithium ions to the lanthanum ions is in a range of 2.2 to 2.5.

A ceramic material of the invention can be used in a method for forming a lithium ion conducting solid-state electrolyte. One non-limiting example method includes the steps of: (a) casting a slurry on a surface to form a layer; and (b) sintering the layer to form a solid-state electrolyte, wherein the slurry comprises a ceramic material of the present invention. In the method, the layer may be sintered at a temperature in a range of 600° C. to 1100° C., and the layer can have a thickness in a range of 10 to 100 microns.

In the method, the slurry may comprise a dispersant providing a source of lithium ions. The dispersant can be selected from the group consisting of salts of lithium and a fatty acid, such as lauric acid, myristic acid, palmitic acid, stearic acid, oleic acid, linoleic acid, linolenic acid, arachidic acid, and behenic acid. The dispersant can be lithium stearate.

In the method, the slurry may comprise a binder. The binder can be selected from the group consisting of non-fluorinated polymeric materials.

In the method, the slurry may comprise a plasticizer selected from the group consisting of plant oils. The plant oil can be selected from the group consisting of coconut oil, castor oil, soybean oil, palm kernel oil, almond oil, corn oil, canola oil, rapeseed oil, and mixtures thereof.

In the method, the slurry may comprise a solvent selected from the group consisting of alkanols, nitriles, alkyl carbonates, alkylene carbonates, alkyl acetates, sulfoxides, glycol ethers, ethers, N-methyl-2-pyrrolidone, dimethylformamide, dimethylacetamide, tetrahydrofuran, and mixtures thereof.

In the method, the slurry may comprise a sintering aid. The sintering aid provides a source of borate, silicate, phosphate, or alum inate ions. The sintering aid can be selected from the group consisting of boric acid, boric acid salts, boric acid esters, boron alkoxides, phosphoric acid, phosphoric acid salts, phosphate acid esters, silicic acid, silicic acid salts, silanols, silicon alkoxides, aluminum alkoxides, and mixtures thereof.

In one non-limiting example of the method, the slurry comprises: 35-65 wt % of a ceramic material of the present invention; 1-5 wt % of the binder; 0.1-5 wt % of the dispersant; 1-30 wt % of the plasticizer; 0-5 wt % of the sintering aid; and 10-55 wt % of the solvent, wherein all weight percentages are percent by weight of the total slurry.

EXAMPLE

The following Example has been presented in order to further illustrate the invention and is not intended to limit the invention in any way.

Synthesis

A solid state reaction (SSR) was used to synthesize the new phase of the invention. Lithium carbonate (14.2726 grams), lanthanum hydroxide (32.6099 grams), aluminum oxide (0.7878 grams), and zirconium oxide (15.2330 grams) were combined in a 500 mL ball mill jar (agate, Retsch) with 100 balls (10 mm diameter agate, Across International) in a planetary mill (PM 100, Retsch) with 250 mL of cyclohexane and milled for 20 hours (400 RPM, 1 minute on/1 minute off duty cycle with reversed rotational direction after rest). The mixed precursors were poured into an evaporation dish and left to dry. The dry powders were collected and calcined in a furnace (1000° C., 4 hours) to form the phase. The calcined powders were collected and ground in a mortar and pestle (agate, Across international) in preparation for hotpressing. The powders were placed in a ½" diameter die and hotpressed (1100° C. temperature, 8000N load, 1 hour time) to produce a billet. The density was determined by measuring the mass and geometric volume. A disk was cut from the billet using a diamond saw (Buehler IsoMet 1000) and polished for lithium conductivity and activation energy measurements. FIGS. 3, 4, and 5 show the results of characterization of the sample produced in this Example. This Example synthesis does not limit the methods suitable for synthesizing the new phase ceramic material of the invention.

Thus, the present invention provides a ceramic garnet based ionically conducting material that can be used as a solid state electrolyte for an electrochemical device such as a battery or supercapacitor.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A battery comprising a cathode, an anode, and a solid-state electrolyte comprising a ceramic material having a formula of $Li_wA_xM_2Re_{3-y}O_z$ wherein w is 5-7.5, wherein A is selected from B, Al, Ga, In, Zn, Cd, Y, Sc, Mg, Ca, Sr, Ba, and any combination thereof, wherein x is 0-2, wherein M is selected from Zr, Hf, Nb, Ta, Mo, W, Sn, Ge, Si, Sb, Se, Te, and any combination thereof, wherein Re is selected from lanthanide elements, actinide elements, and any combination thereof, wherein y is 0.01-0.75, wherein z is 10.875-13.125, and wherein the material has a garnet-type or garnet-like crystal structure, and wherein the ceramic material is charge neutral, and wherein the Re site is deficient relative to an LLZO $(Li_7La_3Zr_2O_{12})$ reference formulation, and wherein z is selected to be different from the LLZO $(Li_7La_3Zr_2O_{12})$ reference formulation.

2. The battery of claim 1 wherein:
the ceramic material has space groups Ia$\bar{3}$d (no. 230).

3. The battery of claim 1 wherein:
the ceramic material has space groups /4$_1$/ acd (no. 142).

4. The battery of claim 1 wherein:
the ceramic material has space groups Ia$\bar{3}$d (no. 230), and
the ceramic material has space groups /4$_1$/ acd (no. 142).

5. The battery of claim 1 wherein:
the ceramic material at least partially has a tetragonal crystal structure.

6. The battery of claim 1 wherein:
the ceramic material has a total ionic conductivity greater than $10^{-5}$ S/cm.

7. The battery of claim 1 wherein:
the ceramic material has a total lithium ionic conductivity greater than $10^{-5}$ S/cm.

8. The battery of claim 1 wherein:
the ceramic material has an activation energy for ion conduction of less than 0.5 eV, and
the activation energy is measured from a plot of LN ($\sigma$T) [LN(S-K/m)] vs. 1000/T[1/K].

9. The battery of claim 1 wherein:
the ceramic material has an activation energy for lithium ion conduction of less than 0.2 eV at temperatures less than 40° C., and
the activation energy is measured from a plot of LN ($\sigma$T) [LN(S-K/m)] vs. 1000/T[1/K].

10. The battery of claim 1 wherein:
the ceramic material has an activation energy for lithium ion conduction of less than 0.1 eV at temperatures less than 40° C.

11. The battery of claim 1 wherein:
A is Al,
x is greater than zero,

M is Zr, and

Re is lanthanum.

12. The battery of claim 11 wherein:

w is 6-7, x is 0.2-0.3, y is 0.01-0.5, and z is 11.5-12.5.

13. The battery of claim 1 wherein:

the ceramic material has the formula: $Li_{6.58}Al_{0.25}Zr_2La_{2.7}O_{11.715}$.

14. The battery of claim 1, wherein:

the cathode comprises a lithium host material selected from the group consisting of lithium metal oxides wherein the metal is one or more aluminum, cobalt, iron, manganese, nickel and vanadium, and lithium-containing phosphates having a general formula $LiMPO_4$ wherein M is one or more of cobalt, iron, manganese, and nickel.

15. The battery of claim 1 wherein:

the anode comprises a lithium host material is selected from the group consisting of graphite, lithium titanium oxides, hard carbon, tin/cobalt alloy, and silicon/carbon.

16. The battery of claim 1 wherein:

the anode comprises a lithium metal.

17. The battery of claim 1 wherein:

the electrochemical device includes a lithium metal anode and a cathode comprising sulfur.

18. The battery of claim 1 wherein:

the electrochemical device includes a lithium metal anode and a cathode comprising an air electrode.

19. The battery of claim 1 wherein:

the solid-state electrolyte comprises a solid solution of the ceramic material of claim 1 and an additional material having a garnet-type or garnet-like crystal structure.

20. The battery of claim 19 wherein:

the additional material comprises $Li_5La_3Ta_2O_{12}$ (LLTO) and/or $Li_5La_3Nb_2O_{12}$ (LLNO).

21. The battery of claim 1 wherein:

not enough Li is present to balance the Re site deficiency and a cubic phase is still dominant.

* * * * *